United States Patent [19]
You

[11] Patent Number: 5,811,070
[45] Date of Patent: Sep. 22, 1998

[54] PROCESS FOR PRODUCING CALCIUM CARBONATE PARTICLES HAVING A SIZE OF 0.1 TO 1.0 μM

[76] Inventor: Kyu Jae You, 48, Nackdong-ri, Nam-myon, Jungsun-kun, Kangwon-do, Rep. of Korea

[21] Appl. No.: 842,333

[22] Filed: Apr. 23, 1997

[30] Foreign Application Priority Data

May 3, 1996 [KR] Rep. of Korea .................. 1996-14366

[51] Int. Cl.⁶ ..................................................... C01F 11/18
[52] U.S. Cl. ........................................... 423/432; 423/265
[58] Field of Search ..................................... 423/430, 432, 423/266, 275, 265; 106/465

[56] References Cited

U.S. PATENT DOCUMENTS 4,242,318  12/1980  Brohm et al. ........................... 423/430
5,007,964   4/1991  Tsukisaka et al. ...................... 423/432

*Primary Examiner*—Michael L. Lewis
*Assistant Examiner*—Stuart L. Hendrickson
*Attorney, Agent, or Firm*—Blakely Sokoloff Taylor & Zafman

[57] ABSTRACT

A process for producing calcium carbonate particles having an average size of 0.1 to 1.0 μm, the process comprising the steps of introducing carbon dioxide into a milk of lime containing a first reagent to prepare an aqueous suspension containing calcium carbonate particles of 0.4 μm in average size, adding a milk of lime into the aqueous suspension, and continuously reacting a carbonated solution containing a second reagent with the aqueous suspension. Calcium carbonate powders according to the process show a superior quality as a filler for adhesives, paints, inks, papers and plastics, especially PET films.

1 Claim, No Drawings

PROCESS FOR PRODUCING CALCIUM CARBONATE PARTICLES HAVING A SIZE OF 0.1 TO 1.0 μM

BACKGROUND OF THE INVENTION

The present invention relates to a process for the production of calcium carbonate, and in particular, to a process for the production of cubic calcium carbonate particles of uniform size in the range of about 0.1 to about 1.0 μm, by carbonating an aqueous suspension of calcium hydroxide ("milk of lime").

Throughout the specification and appended claims, the term "size" of cubic carbonate particles refers to the length of one edge of the cubic particles, as measured by electron microscopy analysis, and parts and percentages are all by weight unless otherwise specified.

The demand for synthetic calcium carbonate powders is rapidly growing in various fields of industry, including paper making, processing of plastics and rubbers, and preparation of paints, inks and sealants. In particular, fine-sized calcium carbonate powders, which can be easily dispersed by the shear stress when they are admixed with a vehicle or a matrix, are in strong demand as a filler for imparting high quality to end products.

Polyethylene terephthalate (PET) with superior chemical and physical properties is widely used in the form of film, filament and other molding products, for example, magnetic tapes, such as audio and video tapes and films for packaging, agriculture and overhead projectors.

One of the most important properties required in a PET film is slipperiness. Until now, inorganic fine powders, such as silica, $TiO_2$, talc, kaolin, and calcium carbonate, have been used to improve the slipperiness of the PET film by forming fine protrusions on the surface thereof. A thin film having an even surface is required in a magnetic tape for high quality, smaller size, and recording capacity of longer duration, and thus it is essential that the PET film has properties of surface-evenness and abrasion resistance.

To satisfy the above requirements, it is well known that calcium carbonate particles of uniform size in the range of about 0.1 to about 1.0 μm, specifically 0.4±0.2 μm or 0.8±0.2 μm, depending on the application fields of the film, are required.

In a conventional process for preparing calcium carbonate, excluding heavy calcium carbonate, precipitated calcium carbonate particles are produced by a "liquid-liquid" process or by a "liquid-gas" process. In the liquid-liquid process, a solution containing ions, such as sodium carbonate and ammonium carbonate, is reacted with a solution of a calcium compound, such as calcium chloride and calcium acetate. In the liquid-gas process, a milk of lime is reacted with carbon dioxide gas to produce a so-called colloidal calcium carbonate with a cube-like particulate configuration and a particle size of about 0.04 μm, or so-called light calcium carbonate with a spindle-like particulate configuration and a particle size of about 1 μm.

Since fine calcium carbonate particles having an average size of about 0.04 μm show a strong affinity of aggregation, it is difficult to disperse them when used as a filler for plastics and rubbers. To reduce the aggregational affinity, the surfaces of the calcium carbonate particles are coated with organic compounds. Another method is to heat a suspension containing calcium carbonate particles of about 0.04 μm in size until the particles grow to an average size of about 0.08 μm. However, calcium carbonate produced by the above processes have widely varying sizes.

U.S. Pat. No. 3,443,890 (C. G. Sisson et al.) relates to the production of precipitated calcium carbonate of purportedly uniform and fine ultimate particle size. Particles less than about 0.1 μm are precipitated from an aqueous suspension of calcium hydroxide in the presence of about 0.2 to 5% by weight of saccharide or polyol and about 0.2 to 5% of an active $CO_2$ compound.

U.S. Pat. No. 4,018,877 (R. D. A. Wood) describes a carbonation process in which a complex-forming agent for calcium ions is added to an aqueous suspension of calcium hydroxide after the calcium carbonate primary nucleation stage, but before completion of the carbonation stage. Optionally, a long-chain fatty acid or long-chain fatty acid salt can be added, preferably after a final carbonation stage.

U.S. Pat. No. 4,124,688 (H. Shibazaki et al.) provides a process for preparing cubic calcium carbonate crystals of about 0.1 to about 1.0 μm in size, which process comprises a first step of spraying a starting aqueous suspension containing calcium hydroxide and cubic calcium carbonate crystals into a carbon dioxide-containing gas, and a second step of adding calcium hydroxide to the aqueous suspension resulting from the first step and spraying the mixture into a carbon dioxide-containing gas.

U.S. Pat. No. 5,075,093 (H. Tanaka et al.) describes a two-step carbonation method of a milk of lime in which partially carbonated milk of lime is admixed with an aqueous carbonating solution containing an alkali metal carbonate or ammonium carbonate and an alkali metal hydroxide or ammonium hydroxide to complete the carbonation of calcium hydroxide. Particles having a platelet-like configuration of a thickness in the range of 0.1 to 0.3 μm and dimensions within the plane of the platelet from 0.5 to 2 μm are obtained.

U.S. Pat. No. 5,332,564 (V. D. Chanerkar et al.) relates to a process for producing rhombic or barrel shaped precipitated calcium carbonate. Quicklime is slaked in an aqueous solution containing sugar and carbon dioxide is added to the slaked lime slurry until the pH drops from about 11–12 to about 7–8.

U.S. patent application Ser. No. 08/791,861 by the present inventor provides a process for preparing colloidal calcium carbonate particles of uniform size in the range of about 0.04 to about 0.08 μm, which have the properties of lower affinity of aggregation and higher dispersibility in end products.

SUMMARY OF THE INVENTION

It is therefore an object of the present invention to provide a process for producing cubic calcium carbonate particles of uniform size in the range of about 0.1 to about 1.0 μm.

Another object of the present invention is to provide a process for producing calcium carbonate particles of uniform size which are very stable and have a superior quality of dispersibility in the end products.

A further object of the present invention is to provide a process for producing calcium carbonate particles of uniform size which are suitable as a filler for adhesives, paints, inks, papers and plastics, especially PET films.

Thus, the process of the present invention for the production of calcium carbonate particles of uniform size in the range of about 0.1 to about 1.0 μm comprises the steps of:

(a) introducing carbon dioxide into a milk of lime containing a first reagent to prepare an aqueous suspension containing colloidal calcium carbonate particles of about 0.04 μm in average size, the first reagent including sodium glutamate, sugar, or a mixture thereof;

(b) adding a milk of lime into the aqueous suspension from step (a), the amount of the milk of lime added being in the range of about 10 to about 100 parts of calcium hydroxide per 100 parts of calcium carbonate; and (c) continuously admixing a carbon dioxide-saturated solution containing a second reagent with the aqueous suspension from step (b) and carbonating the aqueous suspension at the same time, the second reagent including sodium polyacrylate, a bicarbonate, or a mixture thereof.

DETAILED DESCRIPTION OF THE PREFERRED EMBODIMENT

The present invention will be described below in greater detail.

(1) A milk of lime having a concentration of about 5 to about 15% and a temperature of about 10 to about 55° C. is first prepared. A first reagent is added into the milk of lime at an amount of about 0.1 to about 2.0 parts per 100 parts of calcium hydroxide. The first reagent includes sodium glutamate, sugar, or a mixture thereof. A gas containing carbon dioxide in the range of about 20 to about 40% by volume is introduced into the milk of lime at a rate of about 50 to about 150 liters per minute per kilogram of calcium hydroxide to produce calcium carbonate particles of about 0.04 μm in average size.

(2) The same milk of lime as used in step (1) is additionally introduced into the aqueous suspension from step (1) at an amount of about 10 to about 100 parts of calcium hydroxide per 100 parts of calcium carbonate. (The resulting aqueous suspension is hereinafter referred to simply as "the suspension A").

(3) An aqueous solution containing a second reagent at an amount of about 0.1 to about 5.0 parts per 100 parts of calcium hydroxide initially contained in the milk of lime of step (1) is prepared. The second reagent includes sodium polyacrylate, a bicarbonate such as ammonium, sodium, and potassium bicarbonates, or a mixture thereof. Carbon dioxide is then introduced into the aqueous solution to prepare a carbon dioxide-saturated solution (to be hereinafter referred to simply as "the solution B").

(4) While the solution B at a temperature of about 40 to about 55° C. is introduced into the lower part of a reactor through a pipe, the suspension A having a concentration of about 5 to about 15% and a temperature of about 40 to about 55° C. is introduced into the reactor through another pipe, and admixed with solution B under the condition that the pH of the reaction mixture is controlled in the range of about 8 to about 11. The cubic calcium carbonate particles having an average size of about 0.04 μm initially contained in the suspension A grow in size by deposition of newly produced calcium carbonate on the surfaces of the existing calcium carbonate particles.

(5) The steps of (2) to (4) may be repeated for the aqueous suspension of calcium carbonate resulting from step (4) to obtain calcium carbonate particles having a desirable size in the range of about 0.1 to about 1.0 μm.

According to a process of the present invention, calcium carbonate particles may grow from about 0.04 to about 1.0 μm by the first carbonation, in turn from about 0.1 μm to about 0.2 μm by the second carbonation, from about 0.2 to about 0.4 μm by the third carbonation, from about 0.4 to about 0.7 μm by the fourth carbonation, and from about 0.7 to about 1.0 μm by the fifth carbonation.

The resulting suspension of calcium carbonate from each carbonation step is controlled to a pH lower than 7.0, and then pulverized to be dry product having a desirable size in the range of about 0.1 to about 1.0 μm.

If any of the foregoing conditions of (1) to (5) is not satisfied, cubic calcium carbonate particles of uniform size having a superior quality of dispersibility may not be obtained.

In particular, if the amount of the first reagent in step (1) is smaller than 0.1 part, the amount of the milk of lime added in step (2) is smaller than 10 parts, the amount of the second reagent in step (3) is smaller than 0.1 part, or in step (4), if the suspension A has a concentration lower than 5% or a temperature lower than 40° C., the solution B has a temperature lower than 40° C., or the reaction mixture has a pH higher than 11, the particles may not grow sufficiently so that calcium carbonate particles of 0.1 μm or larger in size can not be obtained.

If the amount of the first reagent in step (1) is larger than 2.0 parts, the amount of the milk of lime added in step (2) is larger than 100 parts, the amount of the second reagent in step (3) is larger than 5.0 parts, or in step (4), if the suspension A has a concentration higher than 15% or a temperature higher than 55° C., the solution B has a temperature higher than 55° C., or the reaction mixture has a pH lower than 8, the calcium carbonate particles produced may have widely varying sizes.

For a better understanding of this invention, Examples and Comparative Examples are given below. All milks of lime used in each Example have the same concentration and temperature.

EXAMPLE 1

An aqueous solution containing 10% of sugar was added into a milk of lime having a concentration of 10% and a temperature of 20° C. at an amount of 0.5 part of sugar per 100 part of calcium hydroxide. A gas containing 30% by volume of carbon dioxide was introduced into the milk of lime at a rate of 100 liters per minute per kilogram of calcium hydroxide initially contained in the milk of lime. An aqueous suspension containing calcium carbonate particles of 0.04 μm in average size was obtained when the suspension reached a pH of 6.8.

A milk of lime was added into the aqueous suspension of calcium carbonate in an amount of 20 parts of calcium hydroxide per 100 parts of calcium carbonate and thereby an aqueous suspension containing 10% of solids (suspension A) at a temperature of 50° C. was prepared.

Carbon dioxide was introduced into an aqueous solution containing 0.5 part of sodium polyacrylate per 100 parts of calcium hydroxide initially contained in the milk of lime at a temperature of 50° C. until the solution reached a pH of 7.2 (solution B).

While the solution B was introduced into a reactor equipped with a stirrer through a pipe, the suspension A was introduced into the reactor through another pipe and admixed with the solution B. The carbonation of the suspension A was effected at a pH of 10.0 to 10.5 and an aqueous suspension containing cubic calcium carbonate particles having an average size of 0.1 μm was obtained.

A milk of lime was newly introduced into the aqueous suspension resulting from the preceding step at an amount of 20 parts of calcium hydroxide per 100 parts of calcium carbonate. Cubic calcium carbonate particles having an average size of 0.2 μm were obtained after carbonation was effected by admixing a new solution B with the aqueous suspension of calcium carbonate.

EXAMPLE 2

Cubic calcium carbonate particles having an average size of 1.0 μm were obtained by following the procedure of Example 1, except that the carbonation by the solution B was effected five times.

EXAMPLE 3

Cubic calcium carbonate particles having an average size of 0.2 μm were obtained by following the procedure of Example 1, except that 0.2 part of sugar and 0.4 part of sodium glutamate, instead of 0.5 part of sugar, per 100 parts of calcium carbonate were added.

EXAMPLE 4

Cubic calcium carbonate particles having an average size of 0.2 μm were obtained by following the procedure of Example 1, except that milks of lime containing 5% of calcium hydroxide instead of 10% thereof were used.

EXAMPLE 5

Cubic calcium carbonate particles having an average size of 0.2 μm were obtained by following the procedure of Example 1, except that milks of lime containing 15% of calcium hydroxide instead of 10% thereof were used.

EXAMPLE 6

Cubic calcium carbonate particles having an average size of 0.2 μm were obtained by following the procedure of Example 1, except that the rate of carbon dioxide-containing gas introduced was 50 liters per minute per kilogram of calcium hydroxide.

EXAMPLE 7

Cubic calcium carbonate particles having an average size of 0.2 μm were obtained by following the procedure of Example 1, except that the rate of carbon dioxide-containing gas introduced was 150 liters per minute per kilogram of calcium hydroxide.

EXAMPLE 8

Cubic calcium carbonate particles having an average size of 0.2 μm were obtained by following the procedure of Example 1, except that the amount of the milk of lime added into the aqueous suspension containing calcium carbonate particles having an average size of 0.1 μm was 80 parts of calcium hydroxide per 100 parts of calcium carbonate.

EXAMPLE 9

Cubic calcium carbonate particles having an average size of 0.2 μm were obtained by following the procedure of Example 1, except that the amount of sodium polyacrylate added was 0.2 part per 100 parts of calcium hydroxide.

EXAMPLE 10

Cubic calcium carbonate particles having an average size of 0.2 μm were obtained by following the procedure of Example 1, except that the amount of sodium polyacrylate added was 3.0 parts per 100 parts of calcium hydroxide.

EXAMPLE 11

Cubic calcium carbonate particles having an average size of 0.2 μm were obtained by following the procedure of Example 1, except that the carbonation was effected at a pH of 8 to 9 instead of 10.0 to 10.5.

Comparative Example 1

Calcium carbonate particles having an average size of 0.08 μm were obtained by following the procedure of Example 1, except that 0.08 part of sugar per 100 parts of calcium hydroxide was added.

Comparative Example 2

Calcium carbonate particles were obtained by following the procedure of Example 1, except that 3.0 parts of sugar per 100 parts of calcium hydroxide was added. The calcium carbonate particles obtained have widely varying sizes of 0.3 to 1.5 μm.

Comparative Example 3

An aqueous suspension containing calcium carbonate particles having an average size of 0.08 μm was prepared by following the procedure of Example 1, except that the carbonation was effected at a pH of 11.0 to 11.5. Calcium carbonate particles having widely varying sizes with an average size of 0.2 μm were obtained by effecting the carbonation five times with the aqueous suspension of calcium carbonate.

Comparative Example 4

Calcium carbonate particles having an average size of 0.2 μm were obtained by following the procedure of Example 1, except that a milk of lime having a concentration of 3% and a temperature of 20° C. instead of a concentration of 10% was used and the aqueous suspension containing calcium carbonate was subjected to carbonation five times.

Comparative Example 5

Calcium carbonate particles having an average size of 0.2 μm were obtained by following the procedure of Example 1, except that the rate of carbon dioxide-containing gas introduced was 200 liters per minute per kilogram of calcium hydroxide and the aqueous suspension containing calcium carbonate was subjected to carbonation five times.

Comparative Example 6

Calcium carbonate particles having an average size of 0.2 μm were obtained by following the procedure of Example 1, except that the amount of a milk of lime added into the aqueous suspension containing calcium carbonate particles having an average size of 0.1 μm was 5 parts of calcium hydroxide per 100 parts of calcium carbonate and the aqueous suspension containing calcium carbonate was subjected to carbonation five times.

Comparative Example 7

Calcium carbonate particles having an average size of 0.2 μm were obtained by following the procedure of Example 1, except that the amount of sodium polyacrylate added was 0.05 part per 100 parts of calcium hydroxide and the aqueous suspension containing calcium carbonate was subjected to carbonation five times.

Comparative Example 8

Calcium carbonate particles having an average size of 0.2 μm were obtained by following the procedure of Example 1, except that the temperature of the suspension A was 30° C. and the aqueous suspension containing calcium carbonate was subjected to carbonation five times.

Comparative Example 9

Calcium carbonate particles having widely varying sizes of 0.2 to 1.5 μm were obtained by following the procedure of Example 1, except that a milk of lime having a concentration of 20% and a temperature of 20° C. instead of a concentration of 10% was used.

Comparative Example 10

Calcium carbonate particles having widely varying sizes of 0.2 to 1.5 μm were obtained by following the procedure of Example 1, except that a milk of lime having a concentration of 10% and a temperature of 7° C. instead of a temperature of 20° C. was used.

Comparative Example 11

Calcium carbonate particles having widely varying sizes of 0.2 to 1.5 μm were obtained by following the procedure of Example 1, except that a gas containing 15% by volume of carbon dioxide was introduced.

Comparative Example 12

Calcium carbonate particles having widely varying sizes of 0.2 to 1.5 μm were obtained by following the procedure of Example 1, except that the rate of carbon dioxide-containing gas introduced was 30 liters per minute per kilograms of calcium hydroxide.

Comparative Example 13

Calcium carbonate particles having widely varying sizes of 0.2 to 1.5 μm were obtained by following the procedure of Example 1, except that the amount of a milk of lime added into the aqueous suspension containing calcium carbonate particles having an average size of 0.1 μm was 150 parts of calcium hydroxide per 100 parts of calcium carbonate.

Comparative Example 14

Calcium carbonate particles having widely varying sizes of 0.2 to 1.5 μm were obtained by following the procedure of Example 1, except that the concentration of the suspension A was 20%.

Comparative Example 15

Calcium carbonate particles having widely varying sizes of 0.2 to 1.5 μm were obtained by following the procedure of Example 1, except that the temperature of the suspension A was 60° C.

Comparative Example 16

Calcium carbonate particles having widely varying sizes of 0.2 to 1.5 μm were obtained by following the procedure of Example 1, except that the temperature of the solution B was 60° C.

Comparative Example 17

Calcium carbonate particles having widely varying sizes of 0.2 to 1.5 μm were obtained by following the procedure of Example 1, except that the carbonation was effected at a pH of 7 to 7.5.

It is evident from the Examples that the process according to the present invention provides cubic calcium carbonate particles of uniform size in the range of about 0.1 to about 1.0 μm.

The calcium carbonate powders produced in the process according to the present invention can be used as a filler for adhesives, paints, inks, papers and plastics, especially PET films, since the powders of uniform size show the improved characteristic of dispersibility and provide an even surface to plastic film.

What is claimed is:

1. A process for producing calcium carbonate particles having an average size of 0.1 μm to 1.0 μm, the process comprising the steps of:

(a) fully carbonating a first milk of lime containing a first reagent by introducing a gas containing 20 to 40% by volume of carbon dioxide thereinto at a rate of 50 to 150 liters per minute per kilogram of calcium hydroxide initially contained in said milk of lime, to prepare an aqueous suspension containing calcium carbonate particles of 0.04 μm in average size, said first reagent including sodium glutamate, sugar, and a mixture thereof, and the amount of said first reagent added being in the range of 0.1 to 2.0 parts per 100 parts of calcium hydroxide initially contained in the milk of lime;

(b) adding a second milk of lime into said aqueous suspension from step (a) in such an amount that 10 to 100 parts by weight of calcium hydroxide is added per 100 parts by weight of calcium carbonate produced in step (a), to prepare a suspension having a concentration of 5 to 15% by weight of solids and a temperature of 40° C. to 55° C.;

(c) continuously admixing a carbon dioxide-saturated solution having a temperature of 40° C. to 55° C. and containing a second reagent with said aqueous suspension from step (b) and simultaneously carbonating said aqueous suspension, said second reagent including at least one of sodium polyacrylate and a bicarbonate, and the amount of said second reagent added being in the range of 0.1 to 5.0 parts per 100 parts of calcium hydroxide initially contained in said first milk of lime of step (a), in which the carbonation of said aqueous suspension is effected under the condition that the pH of said aqueous suspension is controlled in the range of 8 to 100; and (d) controlling the average size of said calcium carbonate particles to said value of 0.1 μm to 1.0 μm by repeating the steps (b) and (c).

* * * * *

UNITED STATES PATENT AND TRADEMARK OFFICE
CERTIFICATE OF CORRECTION

PATENT NO. : 5,811,070
DATED : September 22, 1998
INVENTOR(S) : You

It is certified that error appears in the above-identified patent and that said Letters Patent is hereby corrected as shown below:

In claim 1, at line 35, please delete "8 to 100" and insert --8 to 11--.

Signed and Sealed this

Fifteenth Day of June, 1999

Attest:

Q. TODD DICKINSON

Attesting Officer    Acting Commissioner of Patents and Trademarks